United States Patent [19]

Yamaoka et al.

[11] Patent Number: 4,679,673
[45] Date of Patent: Jul. 14, 1987

[54] MARINE REVERSING CLUTCH ASSEMBLY

[75] Inventors: Kojiro Yamaoka, Nishinomiya; Kazuhiko Yano, Toyonaka; Kazuhiko Ohtsuki, Takarazuka, all of Japan

[73] Assignee: Kanzaki Kokyukoki Mfg. Co., Ltd., Amagasaki, Japan

[21] Appl. No.: 805,609

[22] Filed: Dec. 6, 1985

[30] Foreign Application Priority Data

Jan. 14, 1985 [JP] Japan .................................. 59-4710

[51] Int. Cl.$^4$ .................. F16D 21/04; F16D 11/06; F16H 3/14; B63H 23/08
[52] U.S. Cl. ........................... 192/21; 192/48.91; 192/51; 74/331; 74/377; 74/417; 440/75
[58] Field of Search ............ 192/21, 51, 48.91; 440/75; 74/377, 416, 331, 363, 369, 417

[56] References Cited

U.S. PATENT DOCUMENTS

| | | | |
|---|---|---|---|
| 2,187,967 | 1/1940 | Fawick | 74/377 |
| 2,630,775 | 3/1953 | Kiekhaefer | 440/75 |
| 3,313,171 | 4/1967 | Nagasaki | 192/51 X |
| 3,350,958 | 11/1967 | Casale | 74/417 |
| 3,570,319 | 3/1971 | Arnold | 74/416 X |
| 3,803,934 | 4/1974 | Yokel | 74/417 X |
| 3,952,606 | 4/1976 | Schulz | 74/377 |
| 4,188,833 | 2/1980 | Krauss | 74/417 |
| 4,278,156 | 7/1981 | Yano et al. | 192/48.91 |
| 4,303,400 | 12/1981 | Yano et al. | 440/75 |
| 4,474,072 | 10/1984 | Hallenstvedt | 192/21 X |
| 4,545,469 | 10/1985 | Yogume et al. | 192/51 |
| 4,643,687 | 2/1987 | Yano et al. | 440/75 |

FOREIGN PATENT DOCUMENTS

| | | |
|---|---|---|
| 59098 | 5/1980 | Japan . |
| 156796 | 12/1980 | Japan . |
| 161337 | 10/1982 | Japan . |

*Primary Examiner*—Leslie Braun
*Assistant Examiner*—Richard M. Lorence

[57] ABSTRACT

A reversing clutch assembly (13) for marine angle drive which allows the engine (11) to be mounted horizontally. To provide a required inclination to propeller shaft (12), the transmission path is bent within clutch casing (14) by using conical gearing. The casing (14) includes three horizontal shafts or input shaft (15), clutch shaft (17) and intermediate shaft (18), and only one inclined shaft or output shaft (16). Clutch shaft (17) has thereon forward and backward direction gears (28, 29) which are driven by the input shaft (15) through gear trains comprising spur gears, and double-acting clutch mechanism (30) for selectively coupling each of the direction gears (28, 29) to clutch shaft (17). The conical gearing is disposed only between clutch shaft (17) and output shaft (16) and thus includes only one conical gear (38).

Parallel arrangement of three shafts (15, 17, 18) and use of single conical gear (38) contribute to save cost of the clutch assembly.

5 Claims, 6 Drawing Figures

MARINE REVERSING CLUTCH ASSEMBLY

FIELD OF THE INVENTION

This invention relates to a marine reversing clutch assembly for use in boats such pleasure boats including yachts and motor boats, and fishing boats.

More particularly, the present invention relates to a marine reversing clutch assembly for use in boats and adapted to be incorporated between an engine, mounted at a stern portion of the hull so that its output end is directed towards the stern, and a propeller shaft arranged to extend backwardly and downwardly from the hull. Thus, the present invention relates to a reversing clutch assembly for use in marine angle drive system.

DESCRIPTION OF PRIOR ART

A standard type of such angle drive system is fashioned so that the whole of the propulsion unit from engine to propeller shaft via a reversing clutch assembly is mounted in a posture inclined backwardly and downwardly by an angle equal to an inclination angle to be given to the propeller shaft. In a boat having an angle drive system of this standard type, the height of engine room is enlarged due to the inclined posture of engine so that the adjacent crew space is reduced correspondingly. Enlargement of crew space within the hull of a boat is very important and is always required. From this, there has been proposed some propulsion units of angle drive type in which, while the engine is mounted in a horizontal or nearly horizontal posture, the transmission path is bent at a portion, where the reversing clutch assembly is incorporated, so as to give a required backward and downward inclination in the transmission path.

A simple way for providing a bend in transmission path of an angle drive system is the use of bevel gear mechanism. Such bevel gear mechanism is, however, relatively bulky. Another serious drawback is that bevel gears having a large cone distance of about 330 millimeters are required for bending the transmission path by a small angle of about 15 degrees in accordance with such small inclination angle of propeller shaft. Manufacturing of bevel gears having such large cone distance requires a very large machine, that makes such manufacturing difficult and very expensive. This drawback is eliminated when a bevel gear mechanism of the type shown in FIGS. 14 and 15 of JP, A (Japanese Patent Publication under Art. 65bis of the Japanese Patent Law) No. 55-156796 is employed. In the marine propulsion unit according to this prior art, a reversing clutch assembly having a vertically extending output shaft is mounted at a stern portion of hull in a vertical posture. Below such reversing clutch assembly is disposed a bevel gear mechanism which bends transmission path largely from the vertical direction toward a backward and downward direction so as to provide the required inclination of a small angle to the propeller shaft. Such bevel gear mechanism will reduce the cone distance of bevel gears therefor so that bevel gears may be manufactured with a relatively low cost. The structure according to this prior art will, however, raise the level of reversing clutch assembly and, therefore the level of engine. This will result in a reduction of crew space, too.

Additional prior art references which provide an inclination in the transmission path of angle drive system are U.S. Pat. No. 4,303,400 (see FIG. 14 of this patent) and JP, A No. 55-59098. According to this prior art, gear or another rotatable transmission member mounted on an inclined transmission shaft is co-rotatably connected to such shaft by means of constant velocity universal joint which is disposed within the gear or another rotatable member. In the structure according to the prior art, the mechanism including the constant velocity universal joint for providing a bend or inclination in the transmission path is, however, arranged outside a reversing clutch assembly. This will lengthen the whole of propulsion unit so that crew space will be reduced, too.

U.S. Pat. Nos. 3,570,319 and 4,188,833 disclose another manner for providing a bend or inclination in the transmission path for marine propulsion in which conical gears are used for providing an inclination in the transmission path within a reversing clutch assembly. A conical gear may be manufactured with a low cost by using a hobbing machine with the aid of taper attachment for varying the distance between a hob and the center of a gear blank when the hob is moved across the gear blank so as to form tooth profile. The marine propulsion unit according to this prior art is considered to be satisfactory, because it may be manufactured with a low cost and because the mechanism for providing a bend or inclination in the transmission path does not lengthen the propulsion unit. Such unit still involves, however, the following problem.

In the reversing clutch assembly disclosed in each of the two U.S. patents set forth above, an intermediate shaft is arranged within a clutch casing at a mid level between an input shaft arranged at a high level and an output shaft arranged at a low level. Forward direction propelling power is transmitted from the input shaft directly to the output shaft by a selective operation of forward direction fluid clutch of the multi-disc type on the input shaft, whereas backward direction propelling power is transmitted from the input shaft via the intermediate shaft to the output shaft by a selective operation of backward direction fluid clutch of the muli-disc type on the intermediate shaft. Consequently, conical gears for providing a required backward and downward inclination to the output shaft are provided on the input shaft, intermediate shaft and output shaft. To achieve meshing of these gears on the three shafts, it is required, as is detailed in U.S. Pat. No. 4,188,833, to arrange such three shafts so that each of them is inclined relative to the other two shafts. This will require a high accuracy of machining in manufcturing a reversing clutch assembly resulting in an increase of manufacturing cost. Further, the number of conical gears which are still high in manufacturing cost in comparison with spur gears including helical spur gears is large.

OBJECTS

Accordingly, a primary object of the present invention is to provide a novel marine reversing clutch assembly for use in the angle drive system in which, while conical gear means is used for providing a bend or inclination in transmission path within the clutch assembly itself, transmission shafts in the clutch assembly other than an output shaft thereof are all arranged in parallel with one another for providing a required downward and backward inclination to the output shaft and in which number of required conical gears is reduced, whereby cost for reversing clutch assembly which usually occupies a considerable part of cost for a boat may be reduced.

An attendant object is to provide a novel marine reversing clutch assembly which attains the primary object set forth above without sacrificing a compactness of the clutch assembly.

SUMMARY OF THE INVENTION

These objects are attained in accordance with the present invention as follows:

The present invention relates to a marine reversing clutch assembly for use in boats and adapted to be incorporated between an engine, mounted at a stern portion of the hull so that its output end is directed towards the stern, and a propeller shaft arranged to extend backwardly and downwardly from the hull, and is characterized in:

that a clutch casing for the assembly journals therein a horizontal input shaft extending forwardly from said casing, an inclined output shaft extending backwardly and downwardly from said casing, a horizontal clutch shaft and a horizontal intermediate shaft, said input and output shafts being arranged so that the aft end of said input shaft and the fore end of said output shaft are faced to each other at least at one portion thereof with a small interval therebetween, said clutch shaft being arranged above said input and output shafts and said intermediate shaft being arranged at a mid level between said clutch shaft and said input shaft; and that said clutch shaft has thereon freely rotatable forward direction gear and backward direction gear which are spaced from each other in the forward and backward direction, a clutch means disposed between said forward and backward direction gears and being operative to couple selectively one of said gears to said clutch shaft, and a co-rotatable small gear fixedly mounted on an aft end portion of said clutch shaft, said forward direction gear being meshed with a driving gear, drivenly mounted on said input shaft, and said backward direction gear being drivenly connected to said driving gear through said intermediate shaft and a pair of gears thereon one of which is meshed with said driving gear and the other of which is meshed with said backward direction gear, and said output shaft having thereon a co-rotatable large gear, one of said large gear and said small gear being formed to a conical gear thereby said large gear and small gear being meshed with each other.

In the structure set forth above, rotation of the input shaft is transmitted constantly to the forward direction gear on the clutch shaft via the driving gear on the input shaft in the forward propelling direction and to the backward direction gear on the clutch shaft via the driving gear on the input shaft and the pair of gears on the intermediate shaft in the backward propelling direction. Consequently, when the forward or backward direction gear is selectively coupled to the clutch shaft by a selective operation of the clutch means disposed between such gears the clutch shaft is driven to rotate so as to drive the output shaft at a reduced speed of rotation through the small gear on an aft end portion of clutch shaft and the large gear on the output shaft so that such output shaft and, therefore, propeller shaft to be connected thereto are driven to rotate in the forward or backward propelling direction.

In contrast to the structure disclosed in U.S. Pat. Nos. 3,570,319 and 4,188,833 referred to before, the input shaft employed in the structure according to the present invention is arranged at a low level, such that the aft end of input shaft is faced at least at a portion thereof to the fore end of output shaft which is arranged at a low level for connecting thereto propeller shaft, and a clutch shaft is arranged at a high level within the clutch casing. This arrangement of shafts permits to provide a selective rotation of the clutch shaft in the forward or backward propelling direction when a pair of forward and backward direction gears and clutch means operative therebetween are mounted on the clutch shaft, and also permits to transmit such rotation of clutch shaft to the output shaft arranged below such clutch shaft by providing a single gear train. The present invention has, indeed, realized such structure and provides a required backward and downward inclination to the output shaft by a single conical gear means disposed between the clutch shaft and output shaft.

According to the present invention, the input shaft, clutch shaft and intermediate shaft may thus be arranged in a fully parallel relationship and all of the gears for gear trains disposed between these three shafts may be made spur gears including helical spur gears. Thus, only one conical gear is used. Owing to the structure that, while only the clutch shaft is arranged in a backwardly and downwardly inclined posture, another three shafts are arranged in parallel with one another, the need of machining accuracy is greatly reduced in manufacturing clutch assembly. These facts will contribute to reduce manufacturing costs for marine reversing clutch assembly by a large extent.

Nevertheless, the present invention does not sacrifice the compactness of the clutch assembly. Because the input shaft and output shaft are arranged so that the inner end faces of these shafts are overlapped as viewed in the vertical direction, no substantial difference in level exists between these two shafts within the clutch casing. Owing to this, arrangement of the shafts that the input shaft is disposed at a low level while the clutch shaft is provided at a high level does not enlarge the height of clutch casing. Of the input and output shafts which are disposed within the clutch casing so that they are separated from each other in the forward and backward direction, the input shaft has thereon only one gear for transmitting power towards the clutch shaft and the output shaft has thereon only one gear for taking power from the clutch shaft. Thus, each of these input and output shafts may be small in length so that arrangement of the input shaft at a low level does not enlarge the length of clutch casing in the forward and backward direction. Because the clutch shaft has thereon small gear for transmitting power towards output shaft as well as forward and backward direction gears and clutch means therebetween, such clutch safety is relatively large in length. It is, however, not required to provide any substantial interval between the backward direction gear and small gear on the clutch shaft. Further, the clutch means may be provided so as not to lengthen the clutch shaft by employing a cone clutch or dog clutch as such clutch means. Consequently, the clutch shaft may be provided so that it does not lengthen largely the clutch casing in the forward and backward direction.

Inner end portions of the input shaft and output shaft which are arranged in a fashion detailed before may be journalled in accordance with an embodiment of the present invention by a support wall portion which is formed integrally with an inner wall of the clutch casing so as to project inwards therefrom. Such support wall portion acts as a support common to the input and output shafts so as to simplify support structure for the shafts.

As clutches employed in marine reversing clutch assembly, there are known fluid clutch of the multi-disc type, mechanical clutch of the multi-disc type, cone clutch, dog clutch and the like. Of these clutches, clutch of the muli-disc type having a plurality of friction discs is large in axial length and relatively expensive and also causes a relatively large power loss due to some slipping engagement between the friction discs in the neutral or non-operated condition of the clutch. Such power loss is considerable when fluid clutch of the multi-disc type is employed, because friction discs of the input side for such clutch rotate and thus shear lubricant oil even in the neutral condition of clutch. Dog clutch which transmits torque through engaged clutch dogs or teeth is hard in making such that has a large capacity. In an embodiment of the present invention, cone clutch is thus employed which may be manufactured with a low cost and is small in axial size and which may depress power loss below 2%. It is hard on the other hand to make a cone clutch such that it has a torque-limiting mechanism in itself. According to a preferred embodimet, such cone clutch is thus associated with a torque limiter in a fashion which will be detailed below.

The clutch means between forward and backward direction gears is formed to a cone slidably but non-rotatably mounted on the clutch shaft and having a pair of conical clutch surfaces adapted to be engaged with respective conical surfaces formed to the forward and backward direction gears. In addition to this, a hollow cylindrical housing is rotatably mounted on the input shaft and one and another plurality of friction elements are non-rotatably but slidably supported respectively by the input shaft and cylindrical housing so as to provide a torque limiter of the multi-disc type on the input shaft. The driving gear referred to before is formed integrally with the cylindrical housing at the outer peripheral surface thereof.

Cone clutch itself having the structure set forth above is well known to the art as disclosed in, for example, U.S. Pat. No. 4,278,156. Torque limiter of the multi-disc type recited above is, however, provided in a spare space within the clutch casing. That is, the clutch casing has therein a relatively large open space around the input shaft because such input shaft is separated in position forwardly from the output shaft and because such input shaft has thereon no rotatable transmission member other than only one driving gear. The torque limiter provided by utilizing such spare or open space will protect,in the structure employing a preferred cone clutch, transmission members from overloading.

For an easy manufacturing of such torque limiter, the clutch assembly is constructed according to a further embodiment of the present invention such that the cylindrical housing for the torque limiter includes at the inner peripheral surface thereof with a plurality of spline grooves for supporting said another plurality of friction elements at the outer peripheral portions thereof, said housing further including fore and aft end openings, each having a diameter larger than the outer diameter of said friction elements supported by said housing, and being mounted on said input shaft through a pair of axially spaced ball bearings.

Torque limiter of the multi-disc type employed in the marine reversing clutch assembly according to the prior art is fashioned, as disclosed in, for example, JP-A No. 57-161337, such that a cylindrical housing therefore which is mounted rotatably on a transmission shaft has an end opening of a diameter slightly larger than the outer diameter of the transmission shaft and is journalled at the outer periphery of such housing by clutch casing through a pair of bearings. Consequently, a plurality of axial grooves for supporting friction elements are formed on the inner peripheral surface of such cylindrical housing individually by drilling. Further, a plurality of protrusions must be formed previously to portions, where the axial grooves are to be formed, for assuring a rectilinear movement of drill. These facts will make machining of the cylindrical housing very troublesome. Contrarily to this, the plurality of spline grooves on the inner peripheral surface of cylindrical housing which is supported at the inner side thereof by the input shaft through the pair of ball bearings and, thus, has large openings at both ends may be formed at a time by broaching using spline cutter.

In the reversing clutch assembly according to the present invention, clutch shaft having thereon clutch mechanism which requires lubrication is disposed at a high level within the clutch casing. For supplying lubricant oil from a lower space within the casing accomodating lubricant oil to portions or parts on the clutch shaft requiring lubrication, a lubricant supply mechanism is provided in accordance with a still further embodiment of the present invention in which the clutch shaft is formed therein with a lubricant passage which is communicated with portions to be lubricated on the clutch shaft and has an open end at the fore end face of the clutch shaft, the cylindrical housing for said torque limiter being formed at the outer peripheral surface with an integral pumping gear for pumping lubricant oil from a lower space within the clutch casing up to the open end of said lubricant passage through a lubricant-leading passageway which is defined within the casing.

The pumping gear set forth above is provided so as to be driven to rotate by the input shaft without any particular support structure and has a large diameter so as to be immersed largely below the oil level within clutch casing and to function very effectively.

BRIEF DESCRIPTION OF THE DRAWINGS

The invention will be described in more detail with the aid of embodiment illustrated in the drawings in which.

DESCRIPTION OF A PREFERRED EMBODIMENT

Figure 6:
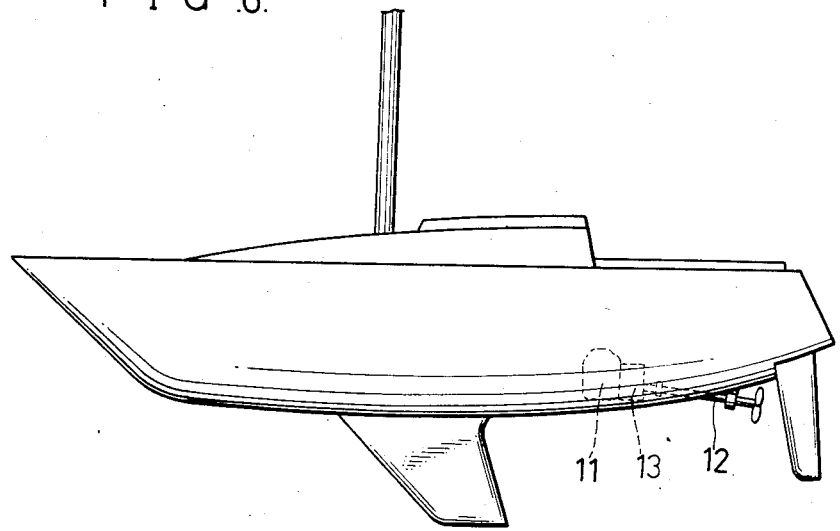
FIG. 6 is a schematic side elevational view of a boat in which the reversing clutch assembly shown in FIGS. 1 and 2 is employed.

The present invention relates to a marine reversing clutch assembly 13 which, as schematically illustrated in FIG. 6, is adapted to be incorporated between an engine 11, mounted at a stern portion of the hull of a boat so that its output end is directed towards the stern, and a propeller shaft 12 arranged to extend backwardly and downwardly from the hull.

Figure 1:
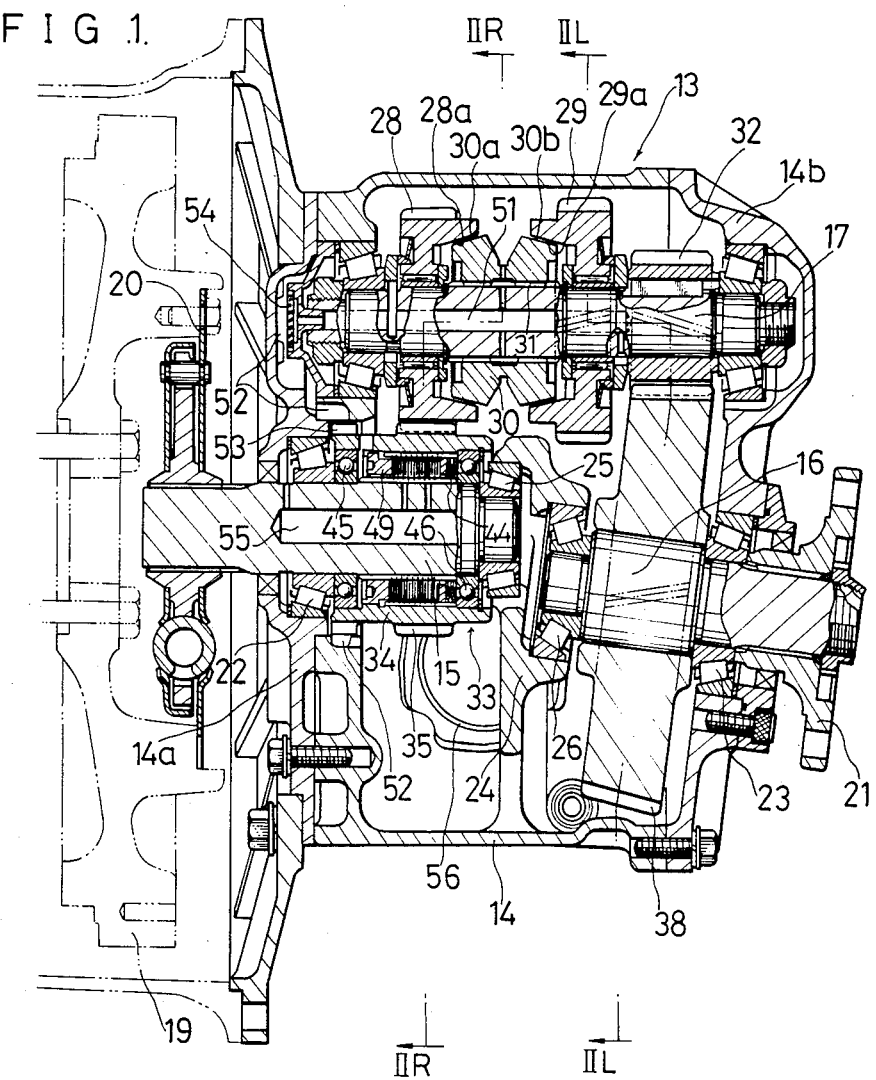
FIG. 1 is a sectional side view of an embodiment of the marine reversing clutch assembly according to the present invention.
Figure 3:
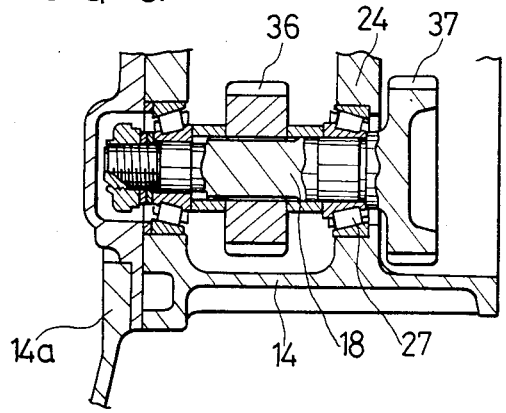
FIG. 3 is a cross-sectional plane view of a part of the reversing clutch assembly shown in FIGS. 1 and 2 taken along line III—III of FIG. 2.
Figure 2:
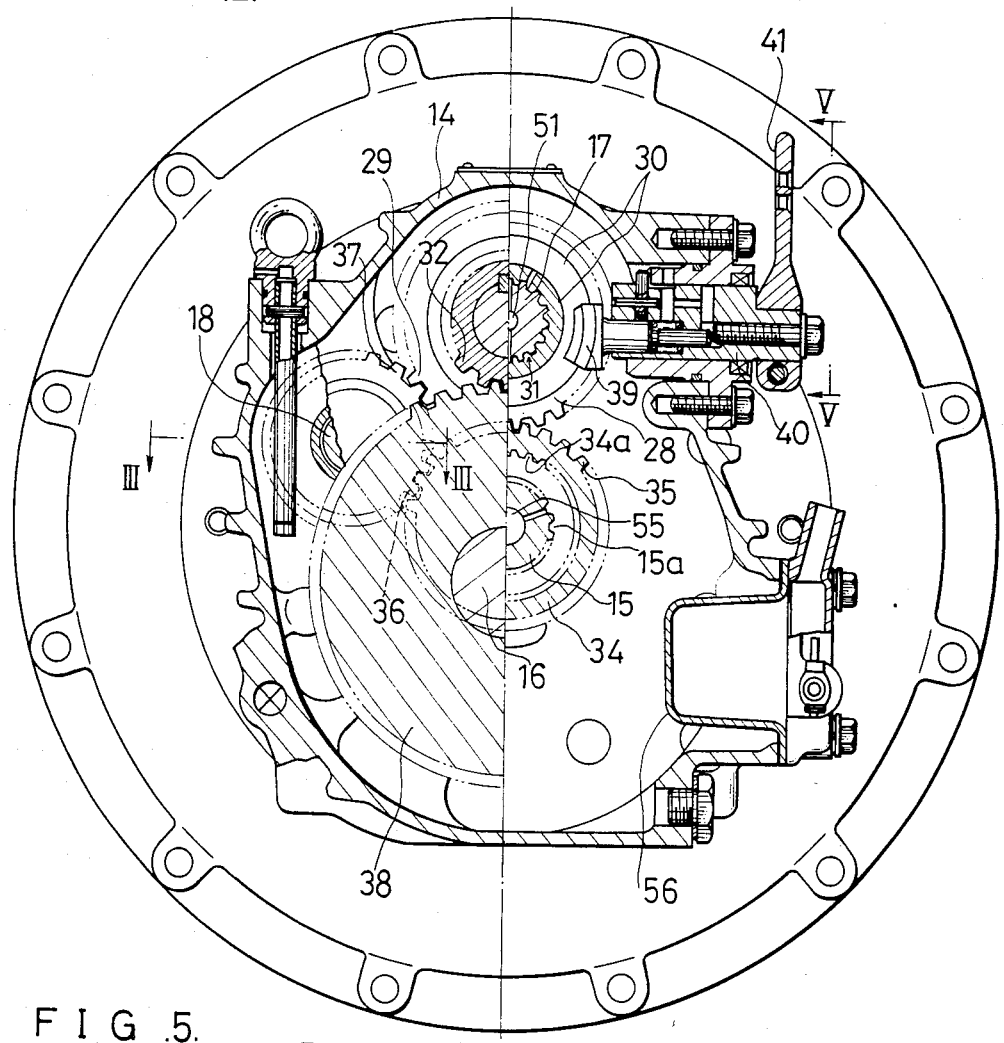
FIG. 2 is a sectional rear view of the reversing clutch assembly shown in FIG. 1, a left half illustrating sectional view taken along line IIL—IIL of FIG. 1 and a right half illustrating sectional view taken along line IIR—IIR of FIG. 1.

As shown in FIG. 1, the reversing clutch assembly 13 comprises a clutch casing 14 to be attached to the rear end of engine. The casing 14 shown has fore and aft end covers 14a and 14b. As shown in FIGS. 1 to 3, clutch casing 14 journals therein an input shaft 15, output shaft 16, clutch shaft 17 and intermediate shaft 18. Of these four shafts, the input shaft 15, clutch shaft 17 and intermediate shaft 18 are arranged to extend horizontally in a parallel relationship with one another. The output shaft 16 is inclined backwardly and downwardly by an angle equal the inclination angle of propeller shaft 12 shown in FIG. 6.

As shown in FIG. 1, the input shaft 15 extends forwardly from the clutch casing 14 and is connected to the fly wheel 19 of engine 11 through a damper coupling 20. The output shaft 16 extends backwardly from the casing 14 and has at its aft end portion a coupling half 21 for connecting the propeller shaft 12. These input shaft 15 and output shaft 16 are particularly arranged so that the aft end of input shaft 15 and the fore end of output shaft 16 are faced to each other at approximately one half of the inner end faces thereof with a small interval therebetween, as can be seen from FIGS. 1 and 2. A fore end portion of input shaft 15 is journaled by the front end cover 14a through a taper roller bearing 22, whereas an aft end portion of output shaft 16 is journaled by the rear end cover 14b through a taper roller bearing 23. An aft end portion of input shaft 15 and a fore end portion of output shaft 16 are particularly journaled through taper roller bearings 25 and 26 by a support wall portion 24 which is formed integrally with the bottom wall of casing 14 and is projected therefrom within the casing. Such support wall portion 24 is bridged between the bottom wall and a side wall of clutch casing 14 and is also used for journaling an aft end portion of the intermediate shaft 18 through a taper roller bearing 27, as shown in FIG. 3.

As shown in FIGS. 1 and 2, the clutch shaft 17 is particularly arranged within the casing 14 so that such shaft 17 is located above the input and output shafts 15 and 16. As shown in FIG. 2, the intermediate shaft is arranged within the casing 14 at a mid level between the clutch shaft 17 and input shaft 15. It is thus seen that, of the plural shafts 15 to 18, clutch shaft 17 takes a highest level within the clutch casing 14.

On this clutch shaft 17 are feely mounted through needle bearings forward direction gear 28 and backward direction gear 29 which are spaced from each other in the forward and backward direction, as shown in FIG. 1. Between these gears 28 and 29 is disposed a cone 30 which constitutes clutch means for coupling selectively each of the gears 28 and 29 to the clutch shaft 17. This cone 30 is slidably but non-rotatably mounted on the shaft 17 by a helical spline connection 31. Cone 30 is formed iwth a pair of conical clutch surfaces 30a and 30b which are adapted to be engaged frictionally with conical clutch surfaces 28a and 29a formed to the forward and backward direction gears 28 and 29. On an aft end portion of the clutch shaft 17 is fixedly mounted a small cylindrical gear 32 by means of a key.

Figure 4:
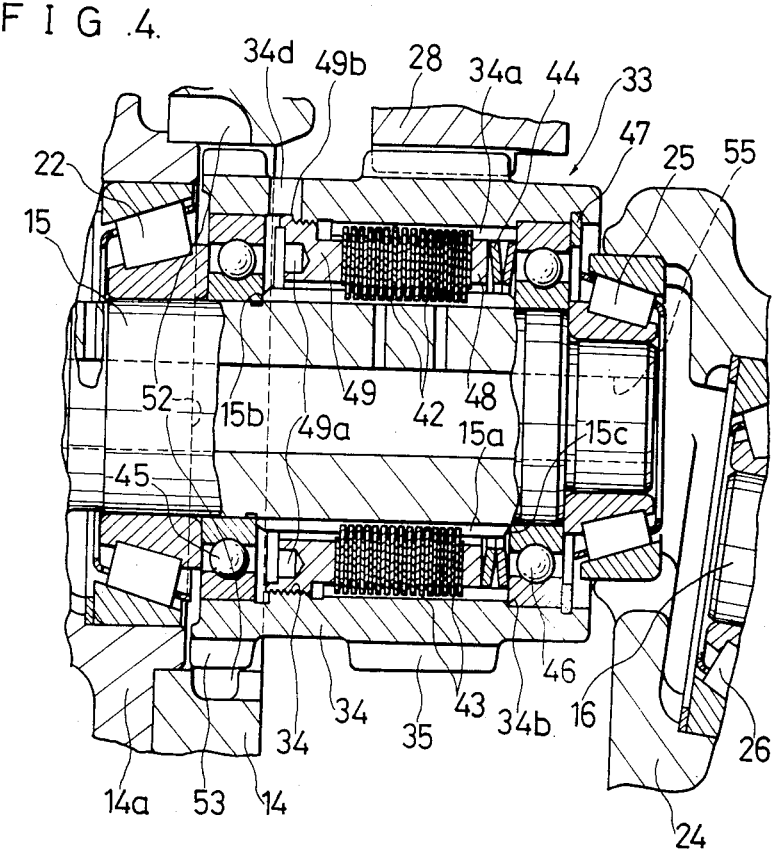
FIG. 4 is an enlarged side sectional view of a part of FIG. 1.

As shown in FIGS. 1 and 4, a torque limiter 33 of the multi-disc type is provided within the clutch casing 14 and on the input shaft 15. This torque limiter 33 comprises a hollow cylindrical housing 34 to which a driving gear 35 for transmitting power from the input shaft 15 towards the clutch shaft 17 is formed integrally at the outer peripheral surface of such housing. Forward direction gear 28 on the clutch shaft 17 is meshed directly with this driving gear 35. As shown in FIG. 3, a pair of gears 36 and 37 are fixedly mounted on the intermediate shaft 18. Of these gears, the forwardly located gear 36 is splined to the shaft 18 and is fixed in position in the axial direction of such shaft. The rearwardly located gear 37 is made integral with the intermediate shaft 18. As shown in FIG. 2, the gear 36 is meshed with the driving gear 35 on the input shaft 15 whereas the gear 37 is meshed with the backward direction gear 29 on the clutch shaft 17. Within the clutch casing 14 the output shaft 16 has a tapered portion on which a large conical gear 38 is press-fitted. This conical gear 38 is meshed with the small cylindrical gear 32 on the clutch shaft 17.

Because of the arrangement of gear trains within the clutch casing 14 having been detailed hereinbefore, rotation of the input shaft 15 is transmitted to the forward direction gear 28 via driving gear 35 and to the backward direction gear 29 via gears 35, 36 and 37. Consequently, forward direction gear 28 on the clutch shaft 17 is driven to rotate in a forward propelling direction whereas backward direction gear 29 on the clutch shaft 17 is driven to rotate in the backward propelling direction. By a selective shifting of cone 30 on the clutch shaft 17, such cluch shaft is driven to rotate selectively in a forward propelling direction by a frictional engagement between the clutch surfaces 30a and 28a or in a backward propelling direction by a frictional engagement between the clutch surfaces 30b and 29a. Such rotation of the clutch shaft 17 is transmitted to the output shaft 16 through the speed-reduction gear train comprising meshed small and large gears 32 and 38, whereby the output shaft 16 and propeller shaft 12 are driven to rotate to cause propulsion of the boat forwards or backwards.

Figure 5:
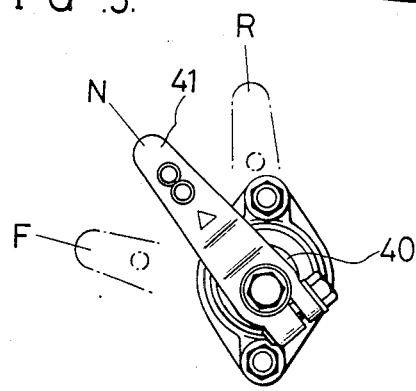
FIG. 5 is a side view, partially omitted, seen along arrow V—V of FIG. 2.

For shifting the cone 30 on the clutch shaft 17 selectively, a shifter 39 shown in FIG. 2 is provided which extends into an annular central groove formed to the cone 30 and engages such cone. This shifter 39 is supported by a rotatable control shaft 40 at an eccentric position of such control shaft. This control shaft 40 extends through a side wall of the clutch casing 14 and has a control lever 41 attached thereto at the outside of casing 14. As shown in FIG. 5, the control lever 41 is operated selectively from a neutral position N, where the cone 30 is located in a neutral position shown in FIG. 1, to rotate into a forward direction position F, where cone 30 is displaced forward to cause a frictional engagement between the clutch surfaces 28a and 30a, or into a backward direction position R where cone 30 is displaced backwards to cause a frictional engagement between the clutch surfaces 29a and 30b. This control lever 41 is operated by a remote control mechanism such that, for example, is disclosed in U.S. Pat. No. 4,278,156 referred to before.

The structure of torque limiter 33 referred to before will be detailed by referring to FIG. 4. As is conventional in torque limiters of the multi-disc type, the input shaft 15 and housing 34 non-rotatably support one and another plurality of friction elements 42 and 43 which are biased to cause frictional engagement therebetween by leaf spring means 44 disposed within the housing 34. The cylindrical housing 34 shown is particularly shaped such that it opens forwards and backwards with fore and aft end openings each having a diameter larger than the outer diameter of friction elements 43 to be supported by such housing 34. While the plurality of friction elements 42 are supported by fitting a plurality of teeth formed to the inner peripheral surface of each of the elements 42 into a plurality of spline grooves 15a formed to the outer peripheral surface of input shaft 15, another plurality of friction elements 43 are supported by the cylindrical housing 34 by fitting a plurality of teeth formed to the outer peripheral surface of each of the elements 43 into a plurality of spline grooves 34a formed to the inner peripheral surface of housing 34. The plurality of spline grooves 34a may be formed at a time by broaching owing to the shape of cylindrical housing 34 having large openings at both ends.

For supporting the cylindrical housing 34 having such large openings at both ends rotatably relative to the input shaft 15, a pair of ball bearings 45 and 46 are used which are disposed on the shaft 15 so as to receive the housing 34 at the inner peripheral surface of such housing. The forwardly located bearing 45 is sandwiched between the taper roller bearing 22 and an annular shoulder 15b at the fore end of the spline groove 15a so as to be fixed in position. Inner race of the rearwardly located bearing 46 is sandwiched between an annular shoulder 15c at the aft end of the spline groove 15a and the taper roller bearing 25, whereas outer race of such bearing 46 is sandwiched between an annular shoulder 34b on the inner peripheral surface of the housing 34 and a snap ring 47 attached to the housing 34 at the inner peripheral surface thereof.

As also shown in FIG. 4, the leaf spring means 44 bears at the base end thereof on the ball bearing 46 and acts at the free end thereof upon the friction elements 42 and 43 through an annular pressure plate 48. The inner peripheral surface of housing 34 is formed with a threaded portion 34c, located before the spline grooves 34a, at which an annular adjusting screw 49 is threadingly fitted into the housing 34. This adjusting screw 49 is employed for adjusting the capacity of torque limiter 33 and is thus used in assembling such limiter 33 so that the screw 49 is firstly rotated in the direction of moving it toward the friction elements 42 and 43 fully so as to obtain a full compression of spring means 44 and, then, is rotated in the reverse direction by a predetermined revolution so as to adjust the biasing force of spring means 44 to a predetermined value. The adjusting screw 49 is provided with bores 49a for removably engaging a rotating tool as well as a tongue 49b which is bent and inserted into a bore 34d formed to the housing 34 after adjusting the biasing force of spring means for preventing a rotation of the screw 49.

For supplying lubricant oil accomodated in a lower space within the clutch casing 14 to portions or parts requiring lubrication on the clutch shaft 17 which takes a high level within the casing 14, a mechanism is provided which will be detailed hereinafter. As shown in FIG. 1, clutch shaft 17 is formed therein with an axially extending lubricant passage 51 which is communicated with portions to be lubricated on the shaft 17 through radial bores in such shaft. This passage 51 has an open end at the fore end face of clutch shaft 17. At the front end portion within the casing 14 is defined a lubricant-leading passageway 52 which communicates at the upper end thereof to the end opening of lubricant passage 51. The passage 52 includes an annular portion surrounding a front end portion of the torque limiter housing 34 by about 180 degrees, as shown in FIG. 4 with dotted line, and has a lower end which opens at a lower portion within the casing 14 below the housing 34. The outer peripheral surface of cylindrical housing 34 is formed with an integral pumping gear 53 which projects into the passageway 52 at the annular portion of such passageway referred to above. It is designed that lubricant oil is accomodated within clutch casing 14 to a level such that approximately a lower half of the input shaft 15 is immersed in the oil. The pumping gear 53 thus pumps such oil upwardly into the lubricant-leading passageway 52 due to splashing action and centrifugal force caused by a rotation of such gear 53. Lubricant oil pumped up by the gear 53 is supplied from lubricant-leading passageway 52 into the lubricant passage 51 through a filter 54 which is incorporated in the passageway 52 at the front of end opening of the lubricant passage 51. Such lubricant oil is then supplied to portions or parts to be lubricated on the clutch shaft 17.

Input shaft 15 is formed therein with a lubricant passage 55 which has an opening at the aft end face of shaft 15 and which is communicated with portions or parts to be lubricated on the input shaft such as friction elements 42 and 43.

As stated before, the marine reversing clutch assembly 13 shown is employed in a boat in a fashion shown in FIG. 6. Because angle of inclination to be given to the propeller shaft 15 is provided by the clutch assembly 13 itself, namely by a corresponding inclination of its output shaft 16, engine 11 is mounted in the hull in a horizontal posture. As can be seen from FIGS. 1 and 2, the inside of clutch casing 14 is almost fully utilized without any substantial dead space so that the clutch assembly 13 is made compact so as to secure a large screw space in a boat. Although some space remains below the torque limiter 33, such space is utilized in the reversing clutch assembly shown for providing a water jacket 56 which cools lubricant oil within the casing 14.

In a boat, the reversing clutch assembly 13 operates to transmit power of the engine 11 to the propeller shaft 12 selectively in a forward or backward propelling direction by a selective shifting of the cone 30 by means of control level 41 so as to couple the forward or backward direction gear 28 or 29 selectively to the clutch shaft 17. As is conventional, torque limiter 33 of the multi-disc type operates to limit torque transmitted therethrough so as to protect transmitting members from overloading in a manner such that when torque having a value larger than a predetermined one corresponding to the biasing force of leaf spring means 44 is applied the friction elements 42 and 43 are in slipping engagement so as to depress the torque.

As gears 28, 29, 35, 36 and 37 of gear trains provided between any two shafts of the in-parallel disposed input shaft 15, clutch shaft 17 and intermediate shaft 18, spur gears are employed. In the clutch assembly shown, such spur gears are made helical spur gears for depressing noise generated from co-rotation of meshed gears. As conical gear means for providing a required downward inclination to the output shaft 16, only one conical gear 38 is employed which connects the output shaft 16 constantly to the clutch shaft 17 so as to be driven to rotate with a reduced speed of rotation by the clutch shaft.

The required inclination of output shaft 16 may be given also by forming the small gear 32 on the clutch shaft 17 into a conical gear in place of the large conical gear 38 on the output shaft 16. It is, however, preferred for an easier adjustment of backlash between the meshing gears 32 and 38 to employ the conical gear 38 shown which is mounted on the output shaft 16 having thereon only one gear.

We claim:

1. A marine reversing clutch assembly for use in boats between an engine, mounted in a stern portion of the hull of a boat with the output end of the engine directed towards the stern, and a propeller shaft extending backwardly and downwardly from the hull, the reversing clutch assembly comprising:

a clutch casing in which are journaled an output shaft having a fore end positioned within said casing, and an aft end extending backwardly and downwardly from said casing, an input shaft having a fore end, and an aft end, said input shaft aft end extending into said casing, and a clutch shaft and an intermediate shaft located within the casing; the input/clutch and intermediate shafts being substantially parallel and the aft end of said input shaft and the fore end of said output shaft facing each other with a small gap therebetween, said output shaft being inclined with respect to said input shaft, said clutch shaft being arranged above said input and output shafts and said intermediate shaft being arranged at a level between those of said clutch shaft and said input shaft; and the clutch shaft having thereon rotatable forward and reverse drive gears, a clutch means disposed between said forward and reverse drive gears and being operative to couple selectively one of said gears to said clutch shaft, and an output gear fixedly mounted on an aft end portion of said clutch shaft, said forward drive gear meshing with a driving gear drivably mounted on said input shaft, and said driving gear meshing with one of two gears on said intermediate shaft the other of said two gears meshing with said reverse drive gear, and said output shaft having thereon an output gear meshing with said output gear of said clutch shaft the output gear of said clutch shaft being smaller than said output gear of said output shaft and one of said output gear being formed as a conical gear.

2. A marine reversing clutch assembly according to claim 1, wherein an inner wall of said clutch casing is formed with an integral support wall portion projected within said casing, the aft end portion of said input shaft and the fore end portion of said output shaft being journaled by said support wall portion through bearings.

3. A marine reversing clutch assembly according to claim 1 or 2, wherein said clutch means is formed as a cone slidably but non-rotatably mounted on said clutch shaft and having a pair of conical clutch surfaces adapted to be engaged with respective conical clutch surfaces formed on said forward and backward direction gears; and a hollow cylindrical housing being rotatably mounted on said input shaft, said input shaft and said housing supporting respectively one and another plurality of friction elements so as to provide a multi-disc torque limiter on said input shaft, said driving gear being formed integrally with said cylindrical housing at the outer peripheral surface thereof.

4. A marine reversing clutch assembly according to claim 3, wherein said cylindrical housing includes at the inner peripheral surface thereof a plurality of spline grooves for supporting said another plurality of friction elements at the outer peripheral portions thereof, said housing further including fore and aft end openings, each having a diameter larger than the outer diameter of said friction elements supported by said housing, and said housing being mounted on said input shaft through a pair of axially spaced ball bearings.

5. A marine reversing clutch assembly according to claim 3, wherein said clutch shaft is formed therein with a lubricant passage which is communicated with portions to be lubricated on said clutch shaft and has an open end at the fore end of said clutch shaft, said cylindrical housing being formed at the outer peripheral surface thereof with an integral pumping gear for pumping lubricant oil from a lower space within said clutch casing up to the open end of said lubricant passage through a lubricant-leading passageway which is defined within said casing.

* * * * *

UNITED STATES PATENT AND TRADEMARK OFFICE
CERTIFICATE OF CORRECTION

PATENT NO. : 4,679,673
DATED : July 14, 1987
INVENTOR(S) : Kojiro Yamaoka et al

It is certified that error appears in the above-identified patent and that said Letters Patent is hereby corrected as shown below:

Col. 11, line 24 change "input/-" to --input,--.

Signed and Sealed this

Third Day of November, 1987

Attest:

DONALD J. QUIGG

*Attesting Officer*　　　　　　*Commissioner of Patents and Trademarks*